(12) United States Patent
Cao et al.

(10) Patent No.: US 11,272,533 B2
(45) Date of Patent: Mar. 8, 2022

(54) RANDOM-ACCESS SENDING AND RECEIVING METHOD AND APPARATUS, TRANSMITTING END AND RECEIVING END

(71) Applicant: XI'AN ZHONGXING NEW SOFTWARE CO., LTD., Xi'An (CN)

(72) Inventors: Wei Cao, Shenzhen (CN); Li Tian, Shenzhen (CN); Wuchen Jiao, Shenzhen (CN); Tao Lu, Shenzhen (CN); Sha Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 204 days.

(21) Appl. No.: 16/492,075

(22) PCT Filed: Mar. 2, 2018

(86) PCT No.: PCT/CN2018/077929
§ 371 (c)(1),
(2) Date: Sep. 6, 2019

(87) PCT Pub. No.: WO2018/161864
PCT Pub. Date: Sep. 13, 2018

(65) Prior Publication Data
US 2020/0383138 A1 Dec. 3, 2020

(30) Foreign Application Priority Data

Mar. 6, 2017 (CN) .......................... 201710128595.2

(51) Int. Cl.
*H04W 74/00* (2009.01)
*H04W 76/11* (2018.01)
(Continued)

(52) U.S. Cl.
CPC ......... *H04W 74/008* (2013.01); *H04L 5/0051* (2013.01); *H04L 5/10* (2013.01);
(Continued)

(58) Field of Classification Search
CPC ........... H04W 74/008; H04W 74/0833; H04W 72/0406; H04W 56/002; H04W 72/0446; H04L 5/0091; H04L 5/003
See application file for complete search history.

(56) References Cited

U.S. PATENT DOCUMENTS

| 9,775,177 | B2 * | 9/2017 | Park | H04W 72/042 |
| 2001/0046220 | A1 * | 11/2001 | Koo | H04J 13/0044 370/335 |

(Continued)

FOREIGN PATENT DOCUMENTS

| CN | 101252775 A | 8/2008 |
| CN | 102498746 A | 6/2012 |

(Continued)

OTHER PUBLICATIONS

Supplementary European Search Report for EP 18763699 dated Oct. 30, 2020.

(Continued)

*Primary Examiner* — Raj Jain
(74) *Attorney, Agent, or Firm* — Knobbe, Martens, Olson & Bear, LLP

(57) ABSTRACT

Provided are a random-access sending and receiving method and apparatus, transmitting end, receiving end, and storage medium. The random-access sending method includes: a preamble resource is acquired, and preamble information is generated; a pilot resource is determined according to the preamble resource and a user equipment identifier, and pilot information is generated; data information is acquired, and the data information is mapped to a time-frequency resource, (Continued)

the data information including user equipment identifier information; and a radio frame is formed from the preamble information, the pilot information and the data information, and the radio frame is sent.

12 Claims, 9 Drawing Sheets

(51) Int. Cl.
| | |
|---|---|
| *H04W 72/04* | (2009.01) |
| *H04W 72/12* | (2009.01) |
| *H04W 74/08* | (2009.01) |
| *H04L 5/00* | (2006.01) |
| *H04L 5/10* | (2006.01) |

(52) U.S. Cl.
CPC ... *H04W 72/0446* (2013.01); *H04W 72/0453* (2013.01); *H04W 72/1263* (2013.01); *H04W 74/0833* (2013.01); *H04W 76/11* (2018.02)

(56) References Cited

U.S. PATENT DOCUMENTS

| | | | |
|---|---|---|---|
| 2007/0217353 A1* | 9/2007 | Asa | H04W 88/04 370/315 |
| 2008/0080472 A1* | 4/2008 | Bertrand | H04J 11/005 370/344 |
| 2008/0168114 A1* | 7/2008 | Han | H04L 27/2657 708/209 |
| 2009/0323602 A1* | 12/2009 | Li | H04L 47/14 370/329 |
| 2010/0027486 A1* | 2/2010 | Gorokhov | H04B 1/7075 370/329 |
| 2010/0220664 A1* | 9/2010 | Hooli | H04L 7/041 370/329 |
| 2011/0026445 A1 | 2/2011 | Hao et al. | |
| 2011/0243075 A1 | 10/2011 | Luo et al. | |
| 2013/0003665 A1 | 1/2013 | Pelletier et al. | |
| 2014/0029560 A1* | 1/2014 | Kim | H04L 5/0053 370/329 |
| 2014/0112289 A1* | 4/2014 | Kim | H04L 5/0078 370/329 |
| 2014/0133443 A1* | 5/2014 | Malladi | H04L 5/0091 370/329 |
| 2014/0341163 A1 | 11/2014 | Zhang et al. | |
| 2015/0327218 A1 | 11/2015 | Kim | |
| 2016/0095024 A1* | 3/2016 | Chae | H04W 76/14 370/280 |
| 2016/0173239 A1* | 6/2016 | Kim | H04L 1/1812 370/329 |
| 2016/0227529 A1* | 8/2016 | Rinne | H04L 1/0007 |
| 2016/0329981 A1* | 11/2016 | Chung | H04W 72/042 |
| 2017/0006639 A1* | 1/2017 | Shimizu | H04W 74/0833 |
| 2017/0094690 A1 | 3/2017 | Zhang et al. | |
| 2017/0127414 A1 | 5/2017 | Yi et al. | |
| 2017/0141833 A1* | 5/2017 | Kim | H04L 1/0029 |
| 2017/0163368 A1* | 6/2017 | Kwon | H04J 13/10 |
| 2017/0171690 A1* | 6/2017 | Kim | H04L 51/02 |
| 2017/0230843 A1* | 8/2017 | Ouchi | H04B 7/063 |
| 2017/0231012 A1* | 8/2017 | Sung | H04L 25/00 |
| 2017/0295597 A1* | 10/2017 | Lee | H04W 74/0833 |
| 2020/0383138 A1* | 12/2020 | Cao | H04W 74/008 |

FOREIGN PATENT DOCUMENTS

| | | |
|---|---|---|
| CN | 103249169 A | 8/2013 |
| CN | 106059978 A | 10/2016 |
| WO | WO 2010/148132 A2 | 12/2010 |
| WO | 2015/190883 A1 | 12/2015 |
| WO | WO 2016/017327 A1 | 2/2016 |

OTHER PUBLICATIONS

Office Action for Japanese Patent Application No. 2019-548659.
Korean Office Action issued in application No. 10-2019-7028841 dated Sep. 7, 2020.
CATT, "Discussion if Simplified RACH Procedures", 3GPP TSG RAN WG1 Meeting #87, Reno, USA, Nov. 14-18, 2016.
InterDigital Communications, "2-step random access procedure", 3GPP TSG RAN WG1 AH_NR Meeting, Spokane, USA, Jan. 16-20, 2017.
International Search Report of corresponding PCT Application No. PCT/CN2018/077929—4 pages (dated May 30, 2018).

\* cited by examiner

RANDOM-ACCESS SENDING AND RECEIVING METHOD AND APPARATUS, TRANSMITTING END AND RECEIVING END

CROSS-REFERENCE TO RELATED APPLICATIONS

This is a National Stage Application, filed under 35 U.S.C. 371, of International Patent Application No. PCT/CN2018/077929, filed on Mar. 2, 2018, which claims priority to Chinese patent application No. 201710128595.2 filed on Mar. 6, 2017, contents of both of which are incorporated herein by reference in their entireties.

TECHNICAL FIELD

The present disclosure relates to a technical field of communication technology and, in particular, to a random-access sending and receiving method and apparatus, transmitting end, receiving end, and storage medium.

BACKGROUND

Efficiency of an existing 3GPP long term evolution (LTE for short) random access procedure may no longer satisfy requirements for multiple mainstream application scenes in 5G communication. For example, when an uplink frequent packet service in an enhanced mobile broadband (eMBB) application is accessed, the existing LTE random access procedure has too high signaling overhead relative to the carried data, which results in a low utilization rate of network resources.

SUMMARY

Embodiments of the present disclosure provide a random-access sending and receiving method and apparatus, transmitting end, receiving end and storage medium.

The embodiments of the present disclosure provide a random-access sending method. The method includes steps described below.

A preamble resource is acquired, and preamble information is generated;

a pilot resource is determined according to the preamble resource and a user equipment identifier, and pilot information is generated;

data information is acquired, and the data information is mapped to a time-frequency resource, where the data information includes user equipment identifier information; and a radio frame is formed from the preamble information, the pilot information and the data information, and the radio frame is sent.

The embodiments of the present disclosure further provide a random-access sending apparatus. The apparatus includes a first generation unit, a second generation unit, a mapping unit, a frame forming unit and a sending unit.

The first generation unit is configured to acquire a preamble resource and generate preamble information.

The second generation unit is configured to determine a pilot resource according to the preamble resource and a user equipment identifier, and generate pilot information.

The mapping unit is configured to acquire data information, and map the data information to a time-frequency resource. The data information includes user equipment identifier information.

The frame forming unit is configured to form a radio frame from the preamble information, the pilot information and the data information.

The sending unit is configured to send the radio frame.

The embodiments of the present disclosure further provide a transmitting end. The transmitting end includes a processor and a memory for storing random-access sending programs. When the random-access sending programs are read and executed by the processor, the random-access sending programs implement operations described below.

A preamble resource is acquired, and preamble information is generated;

a pilot resource is determined according to the preamble resource and a user equipment identifier, and pilot information is generated;

data information is acquired, and the data information is mapped to a time-frequency resource, where the data information includes user equipment identifier information; and a radio frame is formed from the preamble information, the pilot information and the data information, and the radio frame is sent.

The embodiments of the present disclosure further provide a random-access receiving method. The method includes steps described below.

A user is detected on all preamble resources;

a potential pilot resource position of a preamble resource of the detected user is determined according to a mapping relationship between preamble resources and pilot resources; and demodulation is performed by means of a pilot at the potential pilot resource position to obtain a user equipment identifier.

The embodiments of the present disclosure further provide a random-access receiving apparatus. The apparatus includes a first detection unit, a second detection unit and a third detection unit.

The first detection unit is configured to detect a user on all preamble resources.

The second detection unit is configured to determine a potential pilot resource position for a preamble resource of the detected user according to a mapping relationship between preamble resources and pilot resources.

The third detection unit is configured to perform demodulation by means of a pilot at the potential pilot resource position to obtain a user equipment identifier.

The embodiments of the present disclosure further provide a receiving end. The receiving end includes a processor and a memory for storing random-access receiving programs. When the random-access receiving programs are read and executed by the processor, the random-access receiving programs implement operations described below.

A user is detected on all preamble resources;

a potential pilot resource position of a preamble resource of the detected user is determined according to a mapping relationship between preamble resources and pilot resources; and demodulation is performed by means of a pilot at the potential pilot resource position to obtain a user equipment identifier.

The embodiments of the present disclosure further provide a storage medium, which stores computer programs. When the computer programs are executed by a processor, the computer programs implement the random-access sending method or the random-access receiving method describe above.

The design of physical layer signals, the corresponding signal transceiver device and the storage medium according to the embodiments of the present disclosure have at least advantages described below.

The preamble, pilot and data are carried in a random access signal, enabling to simultaneously support user discovery and packet data transmission in one uplink transmission. This reduces resource proportion of an access process signaling and increases a utilization rate of network resources. In other words, signaling overhead in a random access procedure can be reduced, and the utilization rate of network resources is increased.

Other features and advantages of the present disclosure will be explained in following specification, and part of which will be apparent from the description or may be learned from the implementation of the present disclosure. Purposes and other advantages of the present disclosure can be realized and attained by the structures particularly pointed out in the specification, claims and drawings.

DETAILED DESCRIPTION

In order to make the present disclosure more clear, the embodiments of the present disclosure will be described in detail below with reference to the accompanying drawings. It should be noted that, if no conflict exists, the embodiments in this disclosure and features in the embodiments may be combined with each other arbitrarily.

Steps shown in flowcharts of the drawings may be performed in a computer system, such as a set of computer executable instructions. In addition, although a logical order is shown in the flowcharts, in some cases, the steps shown or described may be performed in a different order.

Figure 1:
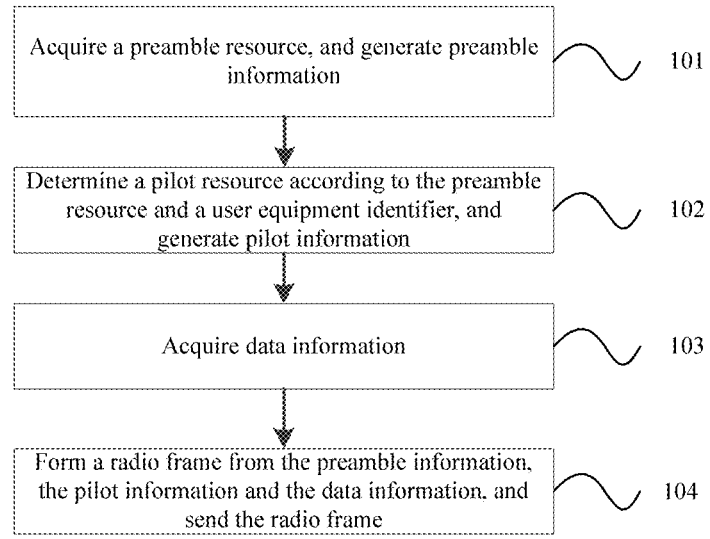
FIG. 1 is a flow chart of a random-access method at a transmitter end according to an embodiment of the present disclosure.

The embodiments of the present disclosure provide a random-access sending method, which is applied to a transmitting end. As shown in FIG. 1, the method includes steps described below.

In step 101, a preamble resource is acquired, and preamble information is generated.

The preamble resource may be randomly selected from a preamble resource pool.

In step 102, a pilot resource is determined according to the preamble resource and a user equipment identifier (i.e., a UE ID), and pilot information is generated.

In step 103, data information is acquired, and the data information is mapped to a time-frequency resource, where the data information includes user equipment identifier information.

In step 104, a radio frame is formed from the preamble information, the pilot information and the data information, and the radio frame is sent.

The signal sending method provided by the embodiments of the disclosure allows one uplink transmission to carry packet data in addition to a user discovery function, which can reduce the resource proportion of an access process signaling and increase the utilization rate of network resources.

Figure 2:
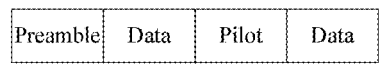
FIG. 2 is a schematic diagram of a potential time domain structure of a signal according to an embodiment of the present disclosure.
Figure 2:
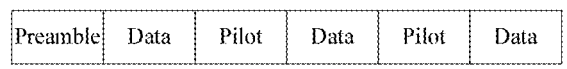

In an optional embodiment of the present disclosure, the time domain structure for preamble information, pilot information and data information is shown in FIG. 2. The structure may be either in an order of preamble, data, pilot and data, or in an order of preamble, data, pilot, data, pilot and data. FIG. 2 illustrates only an example, other time domain structures may be used as required.

In an optional embodiment of the present disclosure, resource grouping is performed on the preamble resource pool and a pilot resource pool respectively to obtain preamble resource groups and pilot resource groups. The preamble resource is one of multiple preamble resource groups of the preamble resource pool; the pilot resource is one of multiple non-overlapping pilot resource groups of the pilot resource pool; and there is a many-to-many mapping relationship between preamble resource groups and pilot resource groups.

Specifically, the preamble resource pool includes at least one root of a zadoff-chu (ZC) sequence and at least two cyclic shifts on each root, and the grouping of the preamble resource pool is to evenly divide the preamble resource pool into N groups according to a selection of the root and cyclic shifts of the ZC sequence, where N is greater than 1. The pilot resource pool includes multiple resource elements (RE for short) in time-frequency domain, and the pilot resources are divided into M non-overlapping groups each including at least one RE. An optional grouping principle is to enable any one group of pilot REs to obtain a reliable channel at an uncovered position through interpolation using frequency domain coherence/time domain coherence.

In an optional embodiment of the present disclosure, the step in which the pilot resource is determined according to the preamble resource and the user equipment identifier includes steps described below.

A start index of the pilot resource is calculated according to the selected preamble resource, an offset of the pilot resource is determined according to the user equipment identifier, and the pilot resource is determined according to the start index and the offset.

The many-to-many mapping relationship between preamble resource groups and pilot resource groups includes: (1) a mapping relationship between preambles and pilots, and (2) a mapping relationship between UE IDs and pilots.

One mapping relationship is:

$$I_{DMRS} = \left(\left\lfloor \frac{I_{preamble}}{n_{p2d}} \right\rfloor + (ID_{ue})_{mod\, n_{id2d}}\right)_{mod\, I_{DMRS}^{max}},$$

where $I_{DMRS}$ is an index of the pilot resource, $I_{preamble}$ is an index of the preamble resource, $n_{p2d}$ is determined according to a number of preamble resources and a number of pilot resources, $ID_{ue}$ is the user equipment identifier, $n_{id2d}$ is an offset of the pilot resource, $I_{DMRS}^{max}$ is a maximum value of $I_{DMRS}$, $\lfloor \ \rfloor$ represents rounding down, and mod represents modulo operation.

A UE ID is a user equipment identifier, and its specific content may be different according to a high layer process of triggering a random access. For example, the UE ID may be a system architecture evolution (SAE) temporary mobile subscriber identifier (S-TMSI), a resume ID, a cell radio network temporary identifier (C_RNTI) or other user identifiers using a form of random numbers in a LTE system. When a high layer triggers a random access, it is necessary to provide a UE ID to a physical layer while optionally providing a high layer message to the physical layer. The UE ID is an independent bit block and its content may also be included in the high layer message.

There is a one-to-one function mapping relationship between part information of UE IDs and pilot resource groups, which may make it possible that multiple UEs, which coincidently select a same preamble resource, have no collision with respect to pilot resource group, this facilitates identification of user collision with respect to preamble.

The embodiments of the present disclosure can support concurrent demodulation for users, advance conflict solving time of a conventional random access, so that access delay is significantly reduced. At the same time, collision probability may be reduced and better performance is achieved in a high density access scene.

Figure 3:
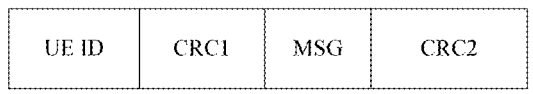
FIG. 3 is a schematic diagram of message content of a data part according to an embodiment of the present disclosure.

In an optional embodiment of the present disclosure, an optional implementation of the data information is shown in FIG. 3, which includes a UE ID, cyclic redundancy check (CRC) 1, a MSG (high layer message) and CRC2.

Independent code modulation and independent CRC (the above mentioned CRC1) are performed for the UE ID and a robust code modulation scheme is used, all bits or part of bits of the UE ID may be included according to a scene; independent code modulation and independent CRC (the above-mentioned CRC2) are performed for the high layer message and a weak code modulation scheme may be used.

In an optional embodiment of the present disclosure, there is a preset mapping relationship between the pilot resource and a time-frequency resource position of the user equipment identifier information.

In an optional embodiment of the present disclosure, the preset mapping relationship is as follows.

A frequency domain position of the user equipment identifier information is consistent with a frequency domain position of the pilot resource, and a time domain position of the user equipment identifier information is adjacent to a time domain position of the pilot resource.

Due to a mapping relationship between bit information of the UE ID part of the data part and a pilot position of the UE, there are two criteria for determining correct reception of UE ID: (1) the CRC1 verification brought by the UE ID; and (2) consistency determination between information of the UE ID part inversely acquired according to a pilot resource group and a UE ID obtained through demodulation. A twofold determination on the correctness of a UE ID contributes to improve accuracy of user detection and facilitates HARQ combination to improve reliability.

Figure 4:
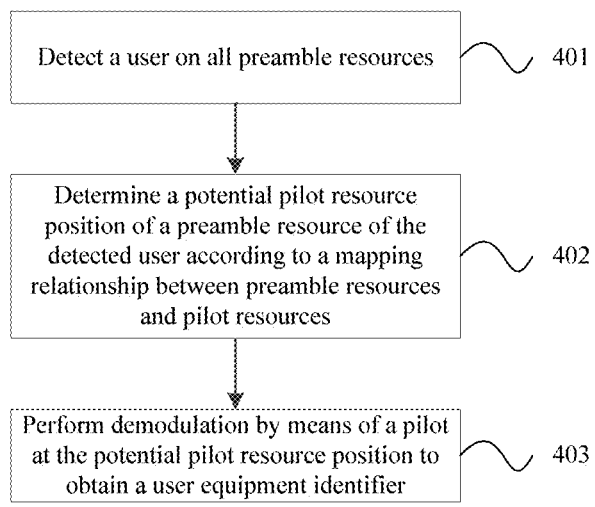
FIG. 4 is a flow chart of a random-access method at a receiver end according to an embodiment of the present disclosure.

The embodiments of the present disclosure further provide a random-access receiving method, which is applied on a receiver. As shown in FIG. 4, the method includes steps described below.

In step 401, a user is detected on all preamble resources.

In step 402, a potential pilot resource position of a preamble resource of the detected user is determined according to a mapping relationship between preamble resources and pilot resources.

In step 403, demodulation is performed by means of a pilot at the potential pilot resource position to obtain a user equipment identifier.

In an optional embodiment of the present disclosure, the step in which demodulation is performed by means of a pilot at the potential pilot resource position to obtain a user equipment identifier includes steps described below.

Demodulation is performed on all potential user equipment identifier positions by means of respective pilots corresponding to the potential user equipment identifier positions; and each user equipment identifier in all demodulated user equipment identifiers is verified according to a check bit of the user equipment identifier and a mapping relationship between user equipment identifiers and pilot resources. Specifically, the demodulation is performed on all potential UE ID positions by means of respective pilots, and correctness of a UE ID is verified by using a logical relationship between CRC1 and corresponding pilot positions. If the UE ID is correct, the correctly demodulated UE ID, CRC1 and a corresponding pilot are reconstructed and eliminated, and the method continues to demodulate other UE IDs.

The mapping relationship between user equipment identifiers and pilot resources may refer to a mapping relationship between user equipment identifiers and pilot resources of the above mentioned transmitter end.

In an optional embodiment of the present disclosure, all potential user equipment identifier positions are positions consistent with frequency domain positions of the pilot resources and adjacent to time domain positions of the pilot resources.

In an optional embodiment of the present disclosure, the method further includes a step described below. A high layer message corresponding to each demodulated user equipment identifier in all demodulated user equipment identifiers is demodulated. Specifically, the step includes that the MSG part is demodulated and correctness of the MSG part is determined using CRC2; if MSG and CRC2 are correctly demodulated, a correctly demodulated user is reconstructed and eliminated, then the above operations will be repeated on a next detected UE, and a corresponding high layer message is demodulated, until the processing has been performed on all UEs.

Since a preamble symbol subcarrier spacing may be different from a data symbol subcarrier spacing, a transceiver device needs to support signal processing with different subcarrier spacings. The signal processing at least includes fast Fourier transformation (FFT) modules with different sizes, up-down sampling filter modules matching with corresponding subcarrier spacings, multi-user detection (MUD for short) modules involving concurrent decoding for users, etc.

The disclosure will be further illustrated by following specific embodiments.

Embodiment 1

In this embodiment, a random access signal in an eMBB packet service application is taken as an example. It should be noted that following implementations are only examples, and each corresponding parameter may be changed as required.

Figure 5:
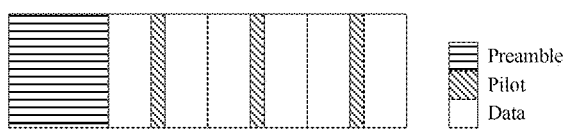
FIG. 5 is a schematic diagram of a time domain structure of a signal in an eMBB packet service according to embodiment 1 of the present disclosure.

First, a time-frequency resource of the random access signal is explained. As shown in FIG. 5, an uplink random access signal provided by embodiment 1 includes a preamble, a pilot and data. The preamble occupies 0.5 ms, the pilot and data together occupy 1.5 ms, and a total duration is 2 ms. A preamble subframe includes 3 consecutively arranged preamble symbols, each (including a cyclic prefix (CP)) having a duration of 0.1667 ms. The pilot and data are divided into 3 time slots, each having a duration of 0.5 ms and includes 7 OFDM symbols. The 4th OFDM symbol (which is located in the middle of the time slot) is the pilot symbol. These conform to a definition of an existing LTE system.

In frequency domain, a system bandwidth is 3.6 MHz, the preamble symbol subcarrier spacing is 7.5 kHz, and the data symbol subcarrier spacing is 15 kHz. There are 480 available subcarriers in the preamble part and 240 available subcarriers in the data part.

The implementation of the preamble part, pilot part and data part will be described below.

Preamble Part

A preamble symbol uses a ZC sequence. The root sequence of the ZC sequence has a length of 479 and is cyclically extended to 480 to occupy all 480 subcarriers. A delay shift sequence is additionally applied to each of the preamble symbols. The delay shift sequence has a length of 480, and granularity of a delay shift angle is $2\pi/32$. Two ZC root sequences (e.g., $u=\{1, 2\}$) are allocated for any one cell. 32 delay shift sequences (i.e., $n_{cs}=\{0, 1, \ldots, n_{cs}^{max}-1\}$, in this embodiment $n_{cs}^{max}$ is equal to 32) are applied on each of the two ZC root sequences. Therefore, any one end user (UE) has 2*32=64 available preamble resource pools.

When the data is sent in uplink each time, the UE randomly selects one value of u and one value of $n_{cs}$ to construct a pilot sequence for the data. The preamble resource index is:

$$I_{preamble}=(u-1) \cdot n_{cs}^{max}+n_{cs}, \quad 0 \leq I_{preamble} \leq 63.$$

A time domain preamble symbol is generated based on the selected preamble sequence, a CP is added to the generated time domain preamble symbol, and the time domain preamble symbol together with the CP is repeated 3 times to occupy 0.5 ms.

Pilot Part

Figure 6:
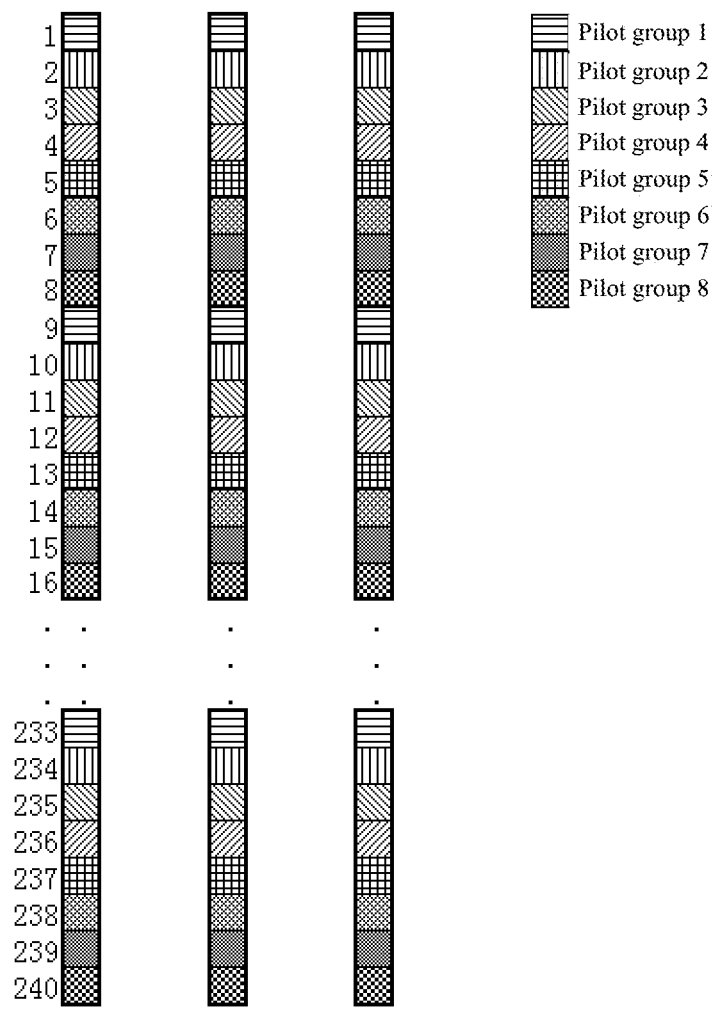
FIG. 6 is a schematic diagram of pilot grouping in an eMBB packet service according to embodiment 1 of the present disclosure.

According to the above-mentioned allocation of time-frequency resources, the pilot part has three OFDM symbols, each including 240 subcarriers; the 240 subcarriers of each OFDM symbol are divided into 8 subcarrier groups which are evenly spaced, each group including 30 subcarriers, as shown in FIG. 6.

The preamble resource index is defined as $I_{DMRS}$ with a value range of $0 \leq I_{DMRS} \leq 7$, where $I_{DMRS}$ is selected according to a following manner:

$$I_{DMRS} = \left(\left\lfloor \frac{I_{preamble}}{8} \right\rfloor + (ID_{ue}) \bmod 2\right)_{\bmod 7}.$$

It may be seen that the selection of a pilot position depends on the preamble resource index and UE ID. After the UE randomly selects the preamble resource index, the pilot position for the UE is further selected according to parity of the UE ID. Therefore, if different UEs happen to select a same preamble resource, pilot resources for the UEs may not collide due to different parity of UE IDs.

It is apparent that the parity selection is only one specific case in this embodiment. A general expression of $I_{DMRS}$ is:

$$I_{DMRS} = \left(\left\lfloor \frac{I_{preamble}}{n_{p2d}} \right\rfloor + (ID_{ue}) \bmod n_{id2d}\right)_{\bmod I_{DMRS}^{max}},$$

where $I_{DMRS}^{max}$ is a maximum value of $I_{DMRS}$, $n_{id2d}$ is an offset of the pilot resource, the offset of the pilot resource may be in a range of $[0, 1, \ldots, (n_{id2d}-1)]$ according to the user equipment identifier, $n_{id2d}$ has a value range of $[1, \ldots, I_{DMRS}^{max}]$. In the above mapping relationship, $$\left\lfloor \frac{I_{preamble}}{n_{p2d}} \right\rfloor$$

represents a many-to-one mapping between preamble resources and pilot resources (i.e., $n_{p2d}$ preamble resources are mapped into one pilot resource, $n_{p2d}$ is determined according to a number of preamble resources and a number of pilot resources, for example, in this embodiment, the number of preamble resources is 64 and the number of pilot resources is 8, so $n_{p2d}$ is 8, this value may be configured.), so $(ID_{ue}) \bmod n_{id2d}$ adds a mapping relationship (that is the offset of the pilot resource is related to the UE ID) between UE IDs and pilot resources.

Compared with a mapping method only using preamble resources to map pilot resources, the above-mentioned mapping method reduces the collision probability on preamble resource and pilot resource at the same time. For example, when collision occurs on a preamble resource, it is still possible to provide a necessary measurement quantity for demodulation of a subsequent data part through a pilot without collision. In addition, even if different UEs collide on a pilot resource, since the preamble resources of these UEs may not collide, the non-colliding preamble parts may still provide a necessary measurement quantity for demodulation of a subsequent data part.

Figure 7:
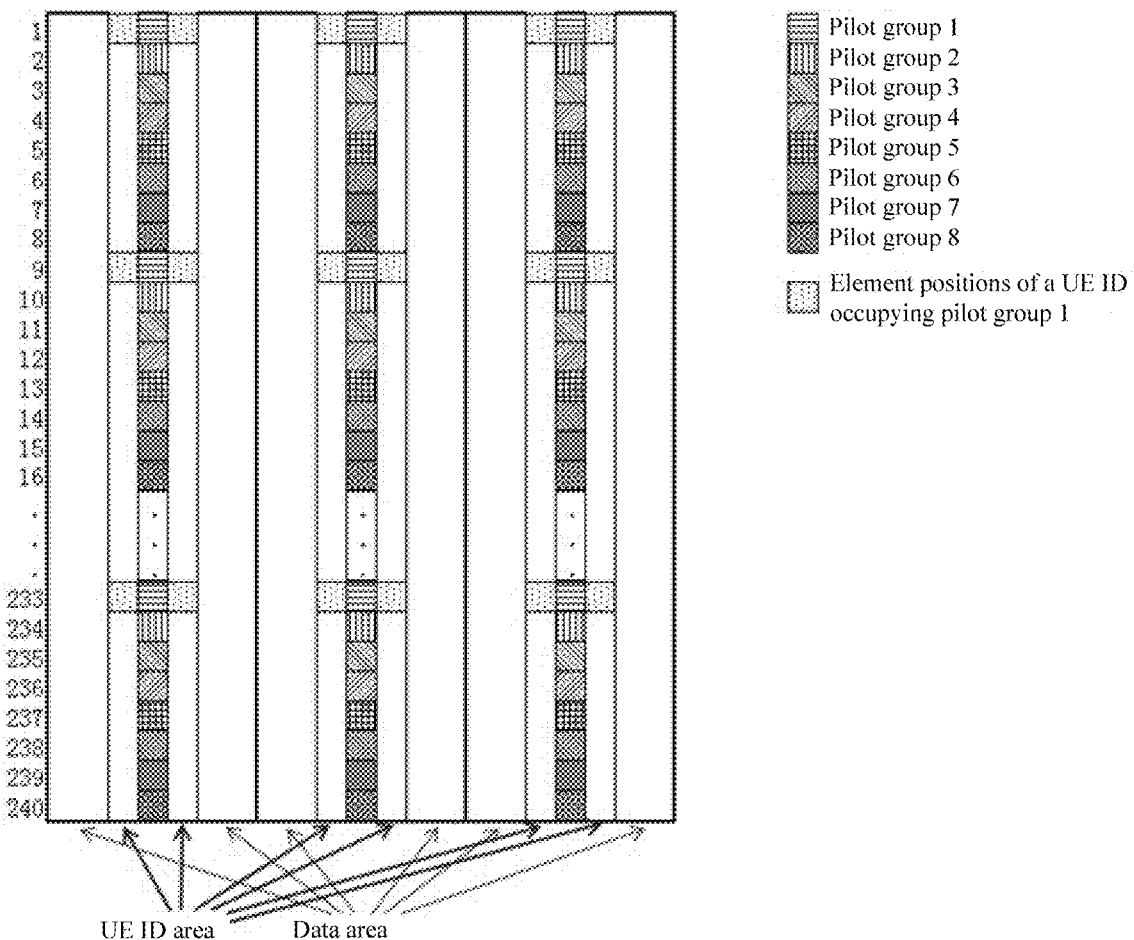
FIG. 7 is a schematic diagram of element positions of a UE ID of the UE occupying a pilot group 1 according to embodiment 1 of the present disclosure.

The data part includes following information:

(1) a 40-bit UE ID and an 8-bit UE ID CRC, which use BPSK modulation with a code rate of 0.27, so that a coded and modulated UE ID occupies 180 REs with mapping positions on both sides of REs for UE pilot; FIG. 7 shows element positions of a UE ID of the UE occupying pilot group 1;

(2) a 696-bit high layer message and a 24-bit high layer message CRC, which use QPSK modulation with a code rate of 0.5, so that a coded and modulated high layer message includes 720 QPSK symbols, and then the message is extended using a MUSA short code with a length of 4 (a code resource pool has a size of 64, and correspondence between resource index and preamble resource index is one-to-one), so that all available REs (2880 REs) are occupied by the high layer message. It should be noted that a data area in FIG. 7 refers to an area occupied by the high layer message.

A processing method of a receiving signal at the receiver end will be described below.

The processing at the receiver end includes three processing procedures: preamble processing, pilot processing and data processing. Those will be described separately as follows.

First, the preamble processing procedure is explained, which includes steps described below.

Three preamble symbols in time domain are extracted, processed to remove CPs, and transformed into frequency domain through FFT, so as to obtain three frequency domain sequences. A ZC base sequence $y_u(n)$ corresponding to each root is applied to the above three frequency domain sequences for local sequence conjugate compensation.

The three frequency domain sequences are summed into one sequence, which is then transformed into time domain through inverse fast Fourier transform (IFFT). A background noise and a detection threshold are obtained. Then energy in each delay shift time window is calculated and is compared with the detection threshold, and a preamble resource index of the detected signal is output.

On the preamble resource index of the detected signal, corresponding measurement qualities such as a frequency offset, a time offset and a channel estimation are calculated using three frequency domain sequences.

Preamble resource index of all detected signals is sorted according to energy.

The pilot processing procedure includes steps described below.

According to the detected preamble resource index, two potential corresponding pilot resource positions are calculated in sequence, and measurement quantities such as the frequency offset, the time offset and the channel estimation are obtained.

The use of the above measurement quantities to decode two potential UE IDs on both sides of the corresponding pilot resource positions includes situations described below.

1) If two UE IDs pass the CRC verification and conform to a mapping relationship of $$I_{DMRS} = \left(\left\lfloor \frac{I_{preamble}}{8} \right\rfloor + (ID_{ue})_{mod\,2}\right)_{mod\,7},$$

it indicates that two UEs with preamble collision are successfully separated.

2) If only one UE ID passes the CRC verification and conforms to the mapping relationship of $$I_{DMRS} = \left(\left\lfloor \frac{I_{preamble}}{8} \right\rfloor + (ID_{ue})_{mod\,2}\right)_{mod\,7},$$

a preamble of the UE is reconstructed by a corresponding pilot and is then eliminated from original preambles. Then the reconstructed preamble is used to calculate the measurement quantities such as the frequency offset, the time offset and the channel estimation, and demodulation is performed again to try to find a potential second UE.

3) If no UE ID passes the CRC verification, then the measurement quantities such as the frequency offset, the time offset and the channel estimation calculated from the preamble are directly used to try demodulation again to find two potential UE IDs.

The data receiving procedure includes steps described below.

For all demodulated UE IDs, corresponding frequency offsets, time offsets, channel estimations and MUSA extension codes are used to demodulate the data. Specifically, in the demodulation, the CRC verification is performed on the data, data having passed the CRC verification is reconstructed, a demodulated user is eliminated from all occupied REs, and the above-mentioned operations are repeated for a next detected UE, until all UEs are processed.

Embodiment 2

In an URLLC application, it is difficult to satisfy a low delay demand when using an existing LTE random access procedure in scheduling-free uplink transmission. In addition, the existing LTE random access procedure does not support the combination of hybrid automatic repeat requests (HARQs), which makes it difficult to guarantee a requirement of reliability. In this embodiment, a mapping relationship among preamble resources, UE IDs and pilot resources is defined. When partial collision occurs, the embodiments of the present disclosure can support concurrent demodulation for users, advance the conflict resolution time in a conventional random access, and the access delay is significantly reduced. In addition, through definition of an independent coding mode in the data part and a relationship between UE ID time-frequency positions and pilot time-frequency positions, accuracy of UE ID detection can be improved, and the combination of HARQs is facilitated, so as to improve reliability of access. In this embodiment, a random access signal in an URLLC service application is taken as an example.

First, a time-frequency resource of the random access signal will be explained.

Figure 8:
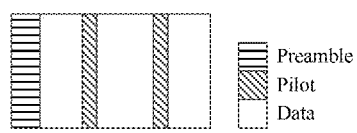
FIG. 8 is a schematic diagram of a time domain structure of a signal in an ultra-reliable low latency communication (URLLC) service according to embodiment 2 of the present disclosure.

As shown in FIG. 8, in this embodiment, the preamble, pilot and data totally occupy 0.5 ms in time domain, including 14 OFDM symbols. The preamble part includes first two successive preamble symbols, the pilot occupies 2 symbols of following 12 OFDM symbols and the data occupies 10 symbols.

In frequency domain, the system bandwidth is 4.32 MHz, all symbol subcarriers have a spacing of 30 kHz, and there are 144 available subcarriers.

The implementation of the preamble part, pilot part and data part will be described below.

Preamble Part

A preamble symbol uses a ZC sequence. The root sequence of the ZC sequence has a length of 139 and is cyclically extended to 144 to occupy all 144 subcarriers. A delay shift sequence is additionally applied to each of the preamble symbols. The delay shift sequence has a length of 144, and granularity of the delay shift angle is $2\pi/16$. Four ZC root sequences (e.g., u={1, 2, 3, 4}) are allocated for any one cell. 16 delayed shift sequences (i.e., $n_{cs}$={0, 1, . . . , $n_{cs}^{max}$−1}, in this embodiment $n_{cs}^{max}$ is equal to 16) may be applied on each root sequence. Therefore, any one end user (UE) has 4*16=64 available preamble resource pools.

When the data is sent in uplink each time, the UE randomly selects one value of u and one value of $n_{cs}$ to construct a pilot sequence for the data. The preamble resource index is $I_{preamble}=(u-1)\cdot n_{cs}^{max}+n_{cs}$, $0\leq I_{preamble}\leq 63$. The selected preamble sequence is used to generate a A time domain preamble symbol is generated based on the selected preamble sequence, a CP is added to the generated time domain preamble symbol, and the time domain preamble, and the time domain preamble symbol together with the CP is repeated twice to occupy first two OFDM symbols.

Pilot Part

Figure 9:
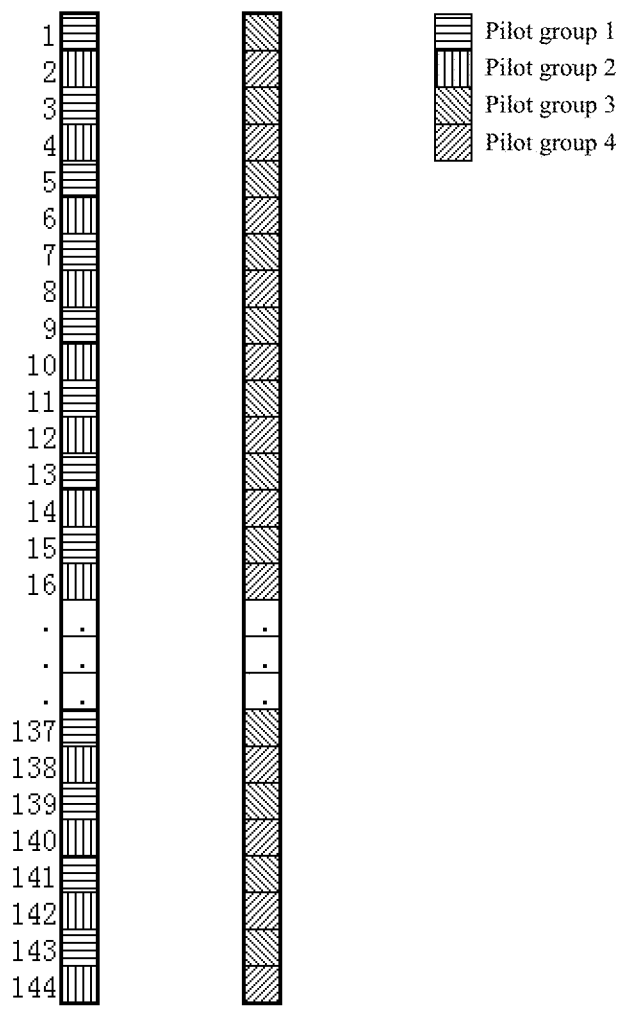
FIG. 9 is a schematic diagram of pilot grouping in an URLLC service according to embodiment 2 of the present disclosure.

According to the above-mentioned allocation of the time-frequency resources, the pilot part has two OFDM symbols, each including 144 subcarriers; the 144 subcarriers of each OFDM symbol are divided into two subcarrier groups which are evenly spaced, so that 144*2 REs are divided into 4 groups, each group including 72 REs, as shown in FIG. 9.

A pilot symbol uses a ZC sequence with the root sequence length of 71, which is cyclically extended to 72 to occupy all 72 subcarriers in each group. A delay shift sequence is additionally applied to each pilot symbol. The delay shift sequence has a length of 72, and the granularity of the delay shift angle is $2\pi/8$. Then 8 delay shift sequences may be applied for any one pilot (i.e., $n_{cs,DMRS}$={0, 1, . . . , $n_{cs,DMRS}^{max}$−1}, in this embodiment $n_{cs,DMRS}^{max}$ is equal to 8). It may be seen that the pilot resource includes 4*8=32 resources.

The pilot resource index is defined as $I_{DMRS}$ with a value range of $0\leq I_{DMRS}\leq 31$. The selection manner of $I_{DMRS}$ is $$I_{DMRS} = \left(\left\lfloor\frac{I_{preamble}}{n_{cs}^{max}}\right\rfloor \cdot n_{cs,DMRS}^{max} + (ID_{ue})_{mod\,8}\right)_{mod\,31}.$$

It may be seen that the selection of a pilot position depends on the preamble resource index and UE ID. After the UE randomly selects the preamble resource index, the pilot resource (including a position resource and a delay shift resource in this example) for the UE is selected according to information on last 3 bits of the UE ID (because of mod 8, the information on last 3 bits is different, and information after mod 8 operation changes accordingly).

If different UEs happen to select a same preamble resource, their pilot resources may not collide because the information on last 3 bits of the UE ID is different. It is apparent that using the last three bits of the UE ID to select is only one specific case of this embodiment, and its general expression is $$I_{DMRS} = \left(\left\lfloor\frac{I_{preamble}}{n_{p2d}}\right\rfloor \cdot n_{cs,DMRS}^{max} + (ID_{ue})_{mod\,n_{id2d}}\right)_{mod\,I_{DMRS}^{max}},$$

where $$\left\lfloor\frac{I_{preamble}}{n_{p2d}}\right\rfloor$$

reflects a many-to-one mapping of preamble resources and pilot resources (i.e., $n_{p2d}$ preamble resource groups are mapped to one pilot resource group), and $(ID_{ue})_{mod\,n_{p2d}}$ adds a corresponding relationship between UE IDs and pilot resources (i.e. a selection of the pilot delay shift resource is related to the UE ID). It may be seen that by using the above mapping method, the collision probability of the preamble resource and the pilot resource at the same time is reduced (compared with the method of mapping pilot resources only using preamble resources). When a preamble collision occurs, it is still possible to provide a necessary measurement quantity for demodulation of a subsequent data part through a pilot without collision. In addition, even if different UEs collide on a pilot resource, since the preamble resources of these UEs may not collide, the non-colliding preamble part may still provide a necessary measurement quantity for demodulation of a subsequent data part.

Figure 10:
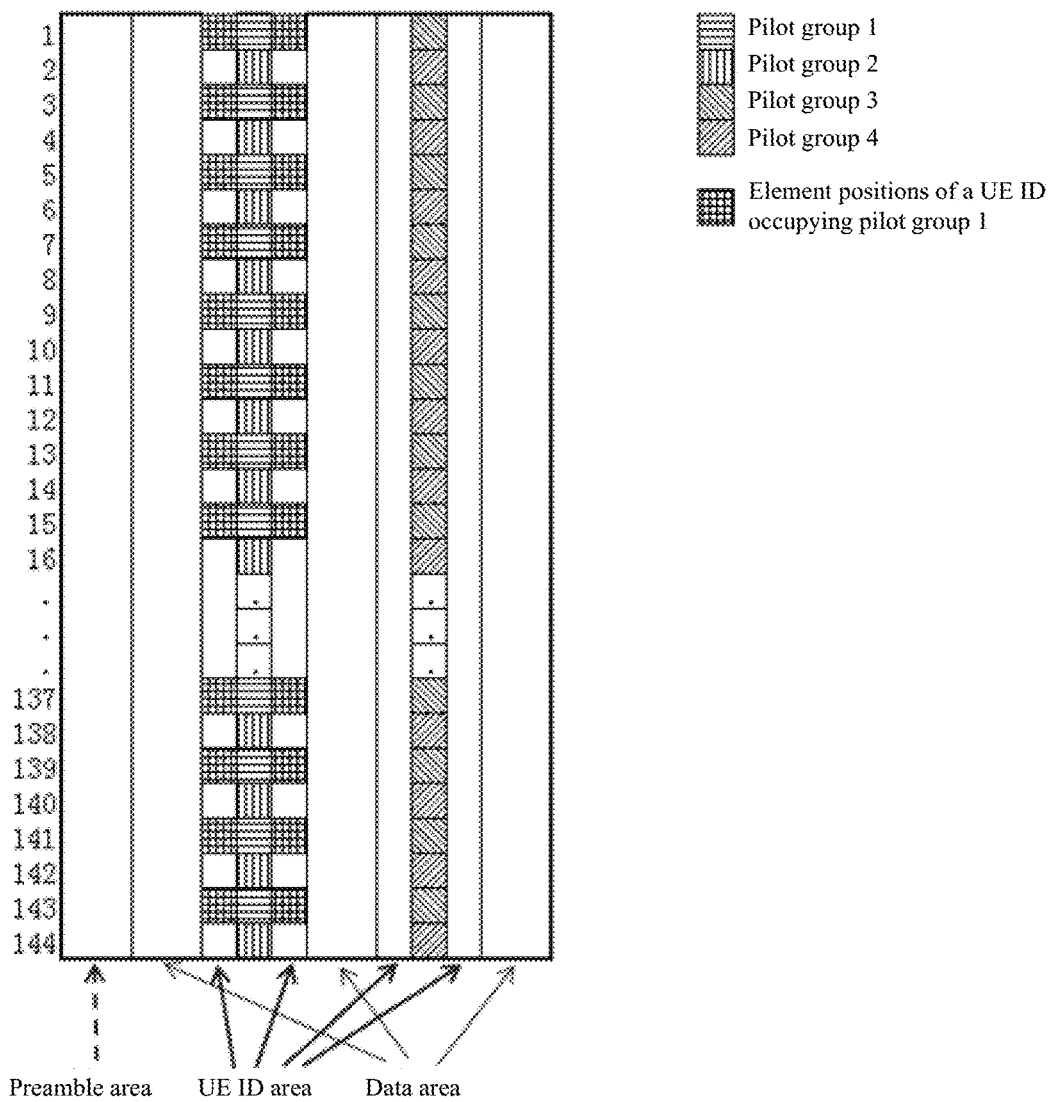
FIG. 10 is a schematic diagram of element positions of a UE ID of the UE occupying the pilot group 1 according to embodiment 2 of the present disclosure.

Content of the data part is described below. The data part includes:

(1) a 40-bit UE ID and an 8-bit UE ID CRC, which use BPSK modulation with a code rate of 0.33 to generate coded and modulated 144 symbols having mapping positions located on both sides of REs for pilot, as shown in FIG. 10; FIG. 10 shows element positions of a UE ID of the UE occupying pilot group 1.

(2) a 232-bit high layer message and a 24-bit high layer message CRC, which use QPSK modulation with a code rate of 0.59, so that the coded and modulated high layer message includes 216 QPSK symbols, and then the message is extended using a MUSA short code with a length of 4 (a code resource pool has the size of 64, and correspondence between the resource index and the preamble resource index is one-to-one), so that all usable REs (864 REs in this embodiment) are occupied by the high layer message.

It should be noted that a data area in FIG. 10 refers to an area occupied by the high layer message of the data part.

Processing at Receiver End

The processing at the receiver end includes three parts: preamble processing, pilot processing and data processing. The specific steps are described as follows.

Preamble Processing

Two preamble symbols in time domain are extracted, processed to remove CPs, and transformed into the frequency domain through FFT, so as to obtain two frequency domain sequences. A ZC base sequence $y_u(n)$ corresponding to each root is applied to the above two frequency domain sequences for local sequence conjugate compensation.

The two frequency domain sequences are summed into one frequency domain sequence, which is then transformed into time domain through IFFT. A background noise and a detection threshold are calculated. Then energy in each delay shift time window is calculated and is compared with the detection threshold, and a preamble resource index of the detected signal is output.

On the preamble resource index of the detected signal, corresponding measurement quantities such as a frequency offset, a time offset and a channel estimation are calculated using the two frequency domain sequences.

Preamble resource index of all detected signals is sorted according to energy.

Pilot Processing

Eight potential corresponding pilot code resource positions are calculated according to the detected pilot resource index in sequence. Behaviors of a base station have following options.

1) A method similar to the preamble detection method is used to calculate the background noise and detection threshold. Then the energy in each pilot delay shift time window is calculated and is compared with the detection threshold, and the pilot resource index of the detected signal is output. Measurement quantities such as the frequency offset, the time offset and the channel estimation are obtained on a pilot resource of a detected user.

2) The measurement quantities such as the frequency offset, the time offset and the channel estimation are calculated directly on the eight potential pilot resources, and eight potential UE IDs on both sides of the corresponding pilot resource positions are decoded.

According to the above behavior selection, the expected number of users on current preamble resource index is less than or equal to eight, and the decoding the UE IDs may include results described below.

1) If the number of detected UE IDs (a determination and detection principle of UE IDs is: a UE ID passes the CRC verification and conforms to a mapping relationship of $$I_{DMRS} = \left( \left\lfloor \frac{I_{preamble}}{n_{cs}^{max}} \right\rfloor \cdot n_{cs,DMRS}^{max} + (ID_{ue})_{mod\,8} \right)_{mod\,31}$$

is equal to the number of expected users, then it indicates that all UE with preamble collision is successfully separated.

2) If the number of detected UE IDs (a determination and detection principle is the same as described above) is less than the number of expected users, a preamble of the UE is reconstructed using a corresponding pilot and is eliminated from original preambles. Then the reconstructed preamble is used to calculate measurement quantities such as the frequency offset, the time offset and the channel estimation, and demodulation is performed again to try to obtain other potential UEs.

3) If no UE ID passes the CRC verification, then measurement quantities such as the frequency offset, the time offset the channel estimation calculated from the preamble are directly used to try demodulation again to try to find eight potential UE IDs.

Data Receiving Processing

For all demodulated UE IDs, corresponding frequency offsets, time offsets, channel estimations and MUSA extension codes are used to demodulate the data. Specifically, in the demodulation, the CRC verification is performed on the data, and data having passed the CRC verification is reconstructed, a demodulated user is eliminated from all occupied REs, and the above operations are repeated on a next detected UE, until all UEs are processed.

Embodiment 3

This embodiment takes a random access signal in an mMTC service application as an example.

The mMTC application refers to a large number of terminals, occasional data packets and a low data rate. The relevant LTE random access procedure can hardly support concurrent connections during dense access, and is very disadvantageous for energy conservation of battery-driven terminals with low power consumption. In the embodiment of the present disclosure, the collision probability of concurrent users can be reduced through the mapping relationship among preamble resources, UE IDs and pilot resources helps to reduce the collision probability of concurrent users and to improve performance in a high-density access scene. In addition, through carrying the preamble, pilot and data in a random access signal, user discovery and packet data transmission can be simultaneously supported in one uplink transmission, which facilitates to reduce the resource proportion of an access process signaling, increase the utilization rate of network resources and reduce the energy consumption of a terminal.

A time-frequency resource of the random access signal of this embodiment will be described first.

Figure 11:
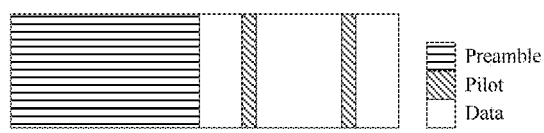
FIG. 11 is a schematic diagram of a time domain structure of a signal in a massive machine type communications (mMTC) service according to embodiment 3 of the present disclosure.

In this embodiment, a specific time domain structure of an uplink signal is shown in FIG. 11. In time domain, the preamble occupies 1 ms, the pilot and data together occupy 1 ms, and the total duration is 2 ms. The preamble subframe includes 3 consecutively arranged preamble symbols, each (including a CP) having a duration of 0.3333 ms. The pilot and data have 14 OFDM symbols in total, and the pilot is located on 4th and 11th OFDM symbols, which conforms to the definition of the existing LTE system.

In frequency domain, the system bandwidth is 720 kHz, the preamble symbol subcarrier spacing is 3.75 kHz, the data symbol subcarrier spacing is 15 kHz. There are 192 available subcarriers in the preamble part and 48 available subcarriers in the data part.

Pilot Part

A preamble symbol uses a ZC sequence. The root sequence of the ZC sequence has a length of 191 and is cyclically extended to 192 to occupy all 192 subcarriers. A delay shift sequence is additionally applied to each preamble symbol. The delay shift sequence has a length of 192, and granularity of the delay shift angle is $2\pi/32$. Four ZC root sequences (e.g., u={1, 2, 3, 4}) are allocated for each one cell. 32 delay shift sequences (i.e., $n_{cs,DMRS}$ {0, 1, . . . , $n_{cs}^{max}-1$}, in this embodiment $n_{cs}^{max}$ is equal to 32) may be applied to each root sequence. Therefore, any one end user (UE) has 4*32=128 available preamble resource pools.

When the data is sent in uplink each time, the UE randomly selects one value of u and one value of $n_{cs}$ to construct a preamble sequence for the data. It may be seen that the preamble resource index is $I_{preamble}=(u-1)\cdot n_{cs}^{max}+n_{cs}$, $0\leq I_{preamble}\leq 128$. The selected preamble sequence is used to generate aA time domain preamble symbol is generated based on the selected preamble sequence, a CP is added to the generated time domain preamble symbol, and the time domain preamble symbol together with the CP is repeated 3 times to occupy 1 ms.

Design of Pilot Part

Figure 12:
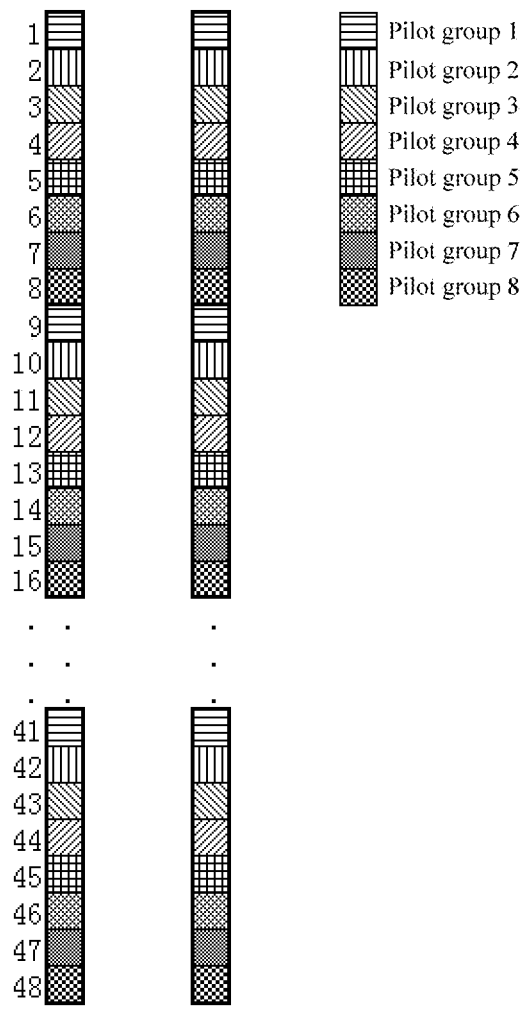
FIG. 12 is a schematic diagram of pilot grouping in an mMTC service according to embodiment 3 of the present disclosure.

According to the above-mentioned allocation of time-frequency resources, the pilot part has two OFDM symbols, each including 48 subcarriers; the 48 subcarriers of each OFDM symbol are divided into 8 subcarrier groups which are evenly spaced, each group including 6 subcarriers, as shown in FIG. 12.

The pilot resource index is defined as $I_{DMRS}$ with a value range of $0\leq I_{DMRS}\leq 7$ where $I_{DMRS}$ is selected according to a following manner:

$$I_{DMRS} = \left( \left\lfloor \frac{I_{preamble}}{16} \right\rfloor + (ID_{ue})_{mod\,2} \right)_{mod\,7}.$$

It may be seen that the selection of a pilot position depends on the preamble resource index and UE ID. After the UE randomly selects the preamble resource index, the pilot position for the UE is also selected according to the parity of the UE ID.

If different UEs happen to select a same preamble resource, pilot resources for the UEs may not collide because of the different parity of UE IDs. It is apparent that the parity selection is only one specific case in this embodiment. The general mapping relationship between the pilot resource index, the preamble resource index and UE IDs and its advantages are the same as those in embodiment 1, which will not be repeated.

Figure 13:
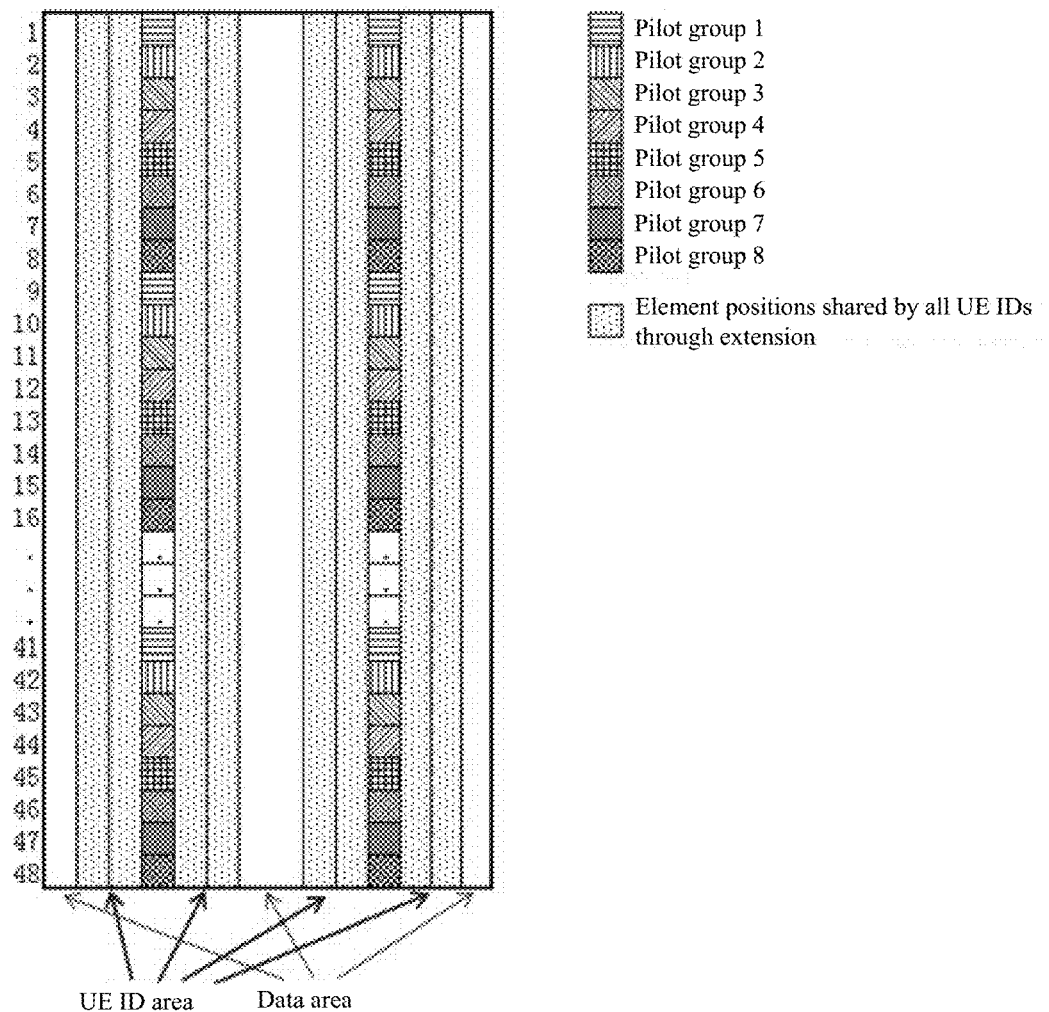
FIG. 13 is a schematic diagram of element positions shared among all UE IDs through extension according to embodiment 3 of the present disclosure.

The data part includes:

(1) a 40-bit UE ID and an 8-bit UE ID CRC, which use BPSK modulation with a code rate of 0.5 to generate coded and modulated 96 symbols. The 96 symbols are extended to 384 REs by using MUSA short code with a length of 4 (a code resource pool has the size of 128, and the correspondence between the resource index and the preamble resource index is one-to-one), and have mapping positions located on both sides of REs for pilot. FIG. 13 illustrates element positions shared by all UE IDs;

(2) a 40-bit high layer message and an 8-bit high layer message CRC, which use QPSK modulation with a code rate of 0.5, so that the coded and modulated high layer message includes 48 QPSK symbols, which is then extended using the MUSA short code with a length of 4 so as to occupy all available REs (192 REs).

It should be noted that a data area in FIG. 13 refers to an area occupied by the high layer message.

Processing at Receiver End

The processing at the receiver end includes three parts: preamble processing, pilot processing and data processing. The specific steps are similar to embodiment 1, except the specific mapping manner of time-frequency resources is different, which will not be repeated here.

Figure 14:
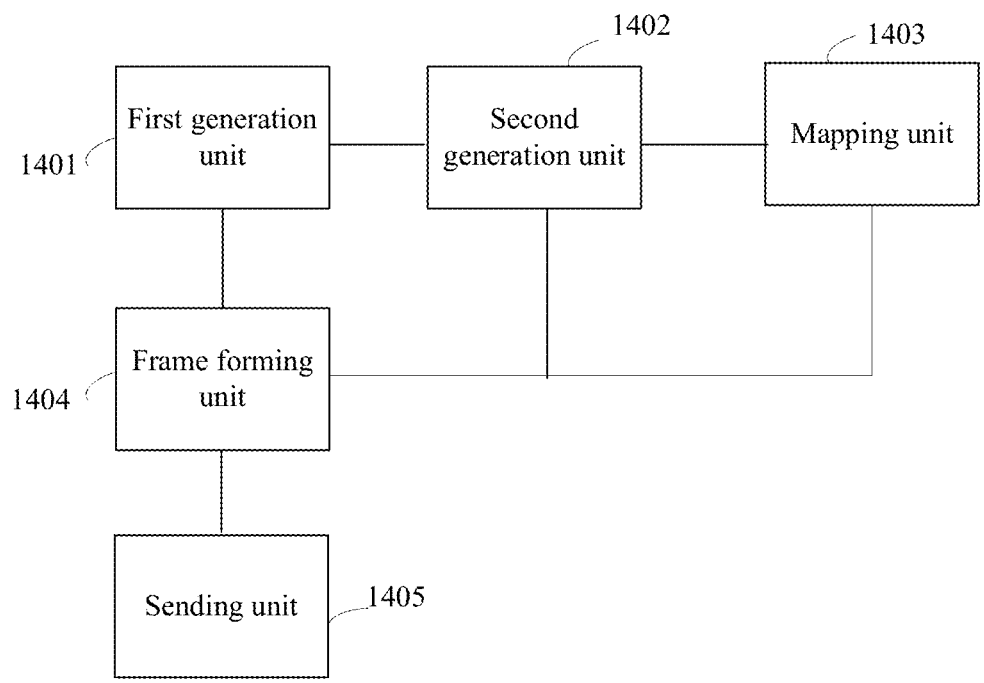
FIG. 14 is a block diagram of a random-access sending apparatus according to an embodiment of the present disclosure.

The embodiments of the present disclosure further provide a random-access sending apparatus. As shown in FIG. 14, the apparatus includes a first generation unit 1401, a second generation unit 1402, a mapping unit 1403, a frame forming unit 1404 and a sending unit 1405.

The first generation unit 1401 is configured to acquire a preamble resource and generate preamble information.

The second generation unit 1402 is configured to determine a pilot resource according to the preamble resource and a user equipment identifier, and generate pilot information.

The mapping unit 1403 is configured to acquire data information, and map the data information to a time-frequency resource. The data information includes user equipment identifier information.

The frame forming unit 1404 is configured to form a radio frame from the preamble information, the pilot information and the data information.

The sending unit 1405 is configured to send the radio frame.

It should be noted that implementation details in method embodiments apply to the random-access sending apparatus and will not be described here.

Figure 15:
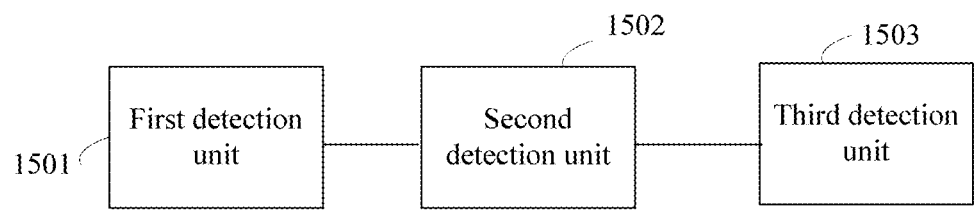
FIG. 15 is a block diagram of a random-access receiving apparatus according to an embodiment of the present disclosure.

The embodiments of the present disclosure further provide a random-access receiving apparatus. As shown in FIG. 15, the apparatus includes a first detection unit 1501, a second detection unit 1502 and a third detection unit 1503.

The first detection unit 1501 is configured to detect a user on all preamble resources.

The second detection unit 1502 is configured to determine a potential pilot resource position for a preamble resource of a detected user according to a mapping relationship between preamble resources and pilot resources.

The third detection unit 1503 is configured to perform demodulation by means of a pilot at the potential pilot resource position to obtain a user equipment identifier.

For specific detection of each unit please refer to the relevant descriptions in the method embodiment, which will not be repeated here.

The embodiments of the present disclosure further provide a transmitting end. The transmitting end includes a processor and a memory storing random-access sending programs. When the random-access sending programs are read and executed by the processor, the random-access sending programs implement the above random-access sending method.

The embodiments of the present disclosure further provide a receiving end. The receiving end includes a processor and a memory storing random-access sending programs. When the random-access receiving programs are read and executed by the processor, the random-access receiving programs implement the above random-access receiving method.

In the embodiments provided in this disclosure, it should be understood that the disclosed technical content can be realized by other means. Where the above-described apparatus embodiments are only schematic, for example, division of the units is only a logic function division, and there may be other division modes in actual implementation, for example, multiple units or components may be combined or integrated into another system, or some features may be ignored or not executed. On the other hand, mutual coupling or direct coupling or communication connections shown or discussed may be indirect coupling or communication connections through some interfaces, units or modules, and may be electrical or other forms.

The units described as separate units may or may not be physically separated, and the units displayed as units may or may not be physical units, i.e., may be located in one place or may be distributed over multiple network units. Some or all of the units may be selected according to actual demands to achieve the purposes of the embodiments.

In addition, each functional unit in each embodiment of the present disclosure may be integrated into one processing unit, each unit may exist separately physically, or two or more units may be integrated into one unit. The above integrated units may be implemented in a form of hardware or software functional units.

If the integrated units implemented in the form of a software functional unit are sold or used as an independent product, it may be stored in a computer readable storage medium. Based on this understanding, the embodiments of the present disclosure can be embodied in a form of a software product, the computer software product is stored in a storage medium and includes several instructions to cause a computer device (which can be a personal computer, a server or a network device, etc.) to perform all or part of the steps of the methods described in various embodiments of the present disclosure. The before mentioned storage media include a U disk, a read-only memory (ROM), a random access memory (RAM), a removable hard disk, a magnetic disk or an optical disk and other media that can store program codes.

That is to say that, the embodiments of the present disclosure provide a storage medium, computer programs are stored on it, when the computer programs are executed by a processor, implement the random-access sending method.

The embodiments of the present disclosure further provide a storage medium, computer programs are stored on it, when the computer programs are executed by a processor, implement the random-access receiving method.

From the above description, it can be seen that the design of a physical layer signal, the corresponding signal transceiver device and storage medium proposed in the embodiments of the present disclosure have following advantages:

through carrying the preamble, pilot and data in a random access signal, user discovery and packet data transmission can be simultaneously supported in uplink transmission at a time, the resource proportion of an access process signaling is reduced, and the utilization rate of network resources is increased, that is, the signaling cost in the random access procedure can be reduced, and the utilization rate of network resources is increased.

In addition, there is a mapping relationship among preamble resources, UE IDs and pilot resources, and when partial collision occurs, the embodiments of the present disclosure can support concurrent users demodulation, advance the conflict resolution time in a conventional random access, and the access delay is significantly reduced; furthermore, the collision probability of concurrent users is reduced, which contributes to improve performance in a high-density access scene.

Due to an independent coding of the data part and the mapping relationship between time-frequency positions of UE IDs and time-frequency positions of the pilot, the detection accuracy of a UE ID is improved, and the combination of HARQs is facilitated to improve the access reliability.

Although the disclosed embodiments of the present disclosure have been described above, the above description is only an embodiment for facilitating understanding of the present disclosure and is not intended to limit the present disclosure. Any person skilled in the art to which this disclosure belongs may make any modifications and changes in the form and details of implementation without departing from the spirit and scope of this disclosure, but the patent protection scope of this disclosure shall still be subject to the scope defined in the appended claims.

INDUSTRIAL APPLICABILITY

In the present disclosure, through carrying the preamble, pilot and data in the random access signal, user discovery and packet data transmission can be simultaneously supported in one uplink transmission. This reduces a resource proportion of an access process signaling and improves a utilization rate of network resources.

What is claimed is:

1. A random-access sending method, comprising:
   acquiring a preamble resource, and generating preamble information;
   determining a pilot resource according to the preamble resource and a user equipment identifier, and generating pilot information;
   acquiring data information, and mapping the data information to a time-frequency resource, wherein the data information comprises user equipment identifier information; and
   forming a radio frame from the preamble information, the pilot information and the data information, and sending the radio frame;
   wherein determining the pilot resource according to the preamble resource and the user equipment identifier comprises:

$$I_{DMRS} = \left( \left\lfloor \frac{I_{preamble}}{n_{p2d}} \right\rfloor + (ID_{ue})_{mod\, n_{id2d}} \right)_{mod\, I_{DMRS}^{max}}$$

wherein $I_{DMRS}$ is an index of the pilot resource, $I_{preamble}$ is an index of the preamble resource, $n_{p2d}$ is determined according to a number of preamble resources and a number of pilot resources, $ID_{ue}$ is the user equipment identifier, $n_{id2d}$ is an offset of the pilot resource, $I_{DMRS}^{max}$ is a maximum value of $I_{DMRS}$, $\lfloor \ \rfloor$ represents rounding down, and mod represents modulo operation.

2. The method according to claim 1, wherein the preamble resource is one of a plurality of preamble resource groups in a preamble resource pool;
   the pilot resource is one of a plurality of non-overlapping pilot resource groups in a pilot resource pool;
   wherein determining the pilot resource according to the preamble resource and the user equipment identifier comprises:
   calculating a start index of the pilot resource according to the preamble resource, determining the offset of the pilot resource according to the user equipment identifier, and determining the pilot resource according to the start index and the offset.

3. The method according to claim 2, wherein a mapping relationship between a time-frequency resource position of the user equipment identifier information and the pilot resource is:
   a frequency domain position of the user equipment identifier information is consistent with a frequency domain position of the pilot resource, and a time domain position of the user equipment identifier information is adjacent to a time domain position of the pilot resource.

4. The method according to claim 1, wherein a mapping relationship between a time-frequency resource position of the user equipment identifier information and the pilot resource is:
   a frequency domain position of the user equipment identifier information is consistent with a frequency domain position of the pilot resource, and a time domain position of the user equipment identifier information is adjacent to a time domain position of the pilot resource.

5. A non-transitory computer readable storage medium, storing computer programs, wherein the computer programs, when executed by a processor, implement steps of the method according to claim 1.

6. A transmitting end, comprising a memory and a processor, wherein the memory stores random-access sending programs, the random-access sending programs, when read and executed by the processor, implement following operations:
   acquiring a preamble resource, and generating preamble information;
   determining a pilot resource according to the preamble resource and a user equipment identifier, and generating pilot information;
   acquiring data information, mapping the data information to a time-frequency resource, wherein the data information comprises user equipment identifier information; and
   forming a radio frame from the preamble information, the pilot information and the data information, and sending the radio frame;
   wherein determining the pilot resource according to the preamble resource and the user equipment identifier comprises:

$$I_{DMRS} = \left( \left\lfloor \frac{I_{preamble}}{n_{p2d}} \right\rfloor + (ID_{ue})_{mod\, n_{id2d}} \right)_{mod\, I_{DMRS}^{max}}$$

wherein $I_{DMRS}$ is an index of the pilot resource, $I_{preamble}$ is an index of the preamble resource, $n_{p2d}$ is determined according to a number of preamble resources and a number of pilot resources, $ID_{ue}$ is the user equipment identifier, $n_{id2d}$ is an offset of the pilot resource, $I_{DMRS}^{max}$ is a maximum value of $I_{DMRS}$, $\lfloor \ \rfloor$ represents rounding down, and mod represents modulo operation.

7. The transmitting end according to claim 6, wherein the preamble resource is one of a plurality of preamble resource groups in a preamble resource pool;

the pilot resource is one of a plurality of non-overlapping pilot resource groups in a pilot resource pool;

wherein determining the pilot resource according to the preamble resource and the user equipment identifier comprises:
calculating a start index of the pilot resource according to the preamble resource, determining the offset of the pilot resource according to the user equipment identifier, and determining the pilot resource according to the start index and the offset.

8. The transmitting end according to claim 7, wherein a mapping relationship between a time-frequency resource position of the user equipment identifier information and the pilot resource is:
a frequency domain position of the user equipment identifier information is consistent with a frequency domain position of the pilot resource, and a time domain position of the user equipment identifier information is adjacent to a time domain position of the pilot resource.

9. The transmitting end according to claim 6, wherein a mapping relationship between a time-frequency resource position of the user equipment identifier information and the pilot resource is:
a frequency domain position of the user equipment identifier information is consistent with a frequency domain position of the pilot resource, and a time domain position of the user equipment identifier information is adjacent to a time domain position of the pilot resource.

10. A random-access receiving method, comprising:
detecting a user on all preamble resources;
determining a potential pilot resource position of a preamble resource of the detected user according to a mapping relationship between preamble resources and pilot resources; and
performing demodulation by means of a pilot at the potential pilot resource position to obtain a user equipment identifier;
wherein the performing demodulation by means of the pilot at the potential pilot resource position to obtain the user equipment identifier comprises:
performing demodulation on all potential user equipment identifier positions by means of respective pilots corresponding to the potential user equipment identifier positions; and
verifying each user equipment identifier in all demodulated user equipment identifiers according to a check bit of the user equipment identifier and a mapping relationship between user equipment identifiers and pilot resources; and
wherein the mapping relationship between user equipment identifiers and pilot resources is:

$$I_{DMRS} = \left( \left\lfloor \frac{I_{preamble}}{n_{p2d}} \right\rfloor + (ID_{ue}) \bmod n_{id2d} \right)_{\bmod I_{DMRS}^{max}}$$

wherein $I_{DMRS}$ is an index of the pilot resource, $I_{preamble}$ is an index of the preamble resource, $n_{p2d}$ is determined according to a number of preamble resources and a number of pilot resources, $ID_{ue}$ is the user equipment identifier, $n_{id2d}$ is an offset of the pilot resource, $I_{DMRS}^{max}$ is a maximum value of $I_{DMRS}$, $\lfloor \ \rfloor$ represents rounding down, and mod represents modulo operation.

11. A receiving end, comprising a memory and a processor, wherein the memory stores random-access receiving programs, the random-access receiving programs, when read and executed by the processor, implement the method according to claim 10.

12. A non-transitory computer readable storage medium, storing computer programs, wherein the computer programs, when executed by a processor, implement steps of the method according to claim 10.

* * * * *

UNITED STATES PATENT AND TRADEMARK OFFICE
CERTIFICATE OF CORRECTION

PATENT NO. : 11,272,533 B2
APPLICATION NO. : 16/492075
DATED : March 8, 2022
INVENTOR(S) : Cao et al.

It is certified that error appears in the above-identified patent and that said Letters Patent is hereby corrected as shown below:

In the Specification

In Column 8, Line 35 (Approx.), delete "is is a" and insert -- is a --.

In Column 14, Line 30 (Approx.), delete "(i.e., $n_{cs,DMRS}$" and insert -- (i.e., $n_{cs,DMRS}=$ --.

Signed and Sealed this
Twenty-first Day of June, 2022

Katherine Kelly Vidal
*Director of the United States Patent and Trademark Office*